United States Patent
Kotalwar et al.

(10) Patent No.: US 9,503,279 B2
(45) Date of Patent: Nov. 22, 2016

(54) NETWORK DEVICE WITH SERVICE AND CLIENT ROUTING ELEMENTS CONFIGURED TO SUPPORT ANY-SOURCE MULTICAST EXTRANETS

(71) Applicant: Alcatel-Lucent USA Inc., Murray Hill, NJ (US)

(72) Inventors: Jayant Kotalwar, Cupertino, CA (US); Chirag Nanavati, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 178 days.

(21) Appl. No.: 14/247,595

(22) Filed: Apr. 8, 2014

(65) Prior Publication Data

US 2015/0288540 A1   Oct. 8, 2015

(51) Int. Cl.
| | | |
|---|---|---|
| *H04L 12/44* | (2006.01) | |
| *H04L 12/761* | (2013.01) | |
| *H04L 12/46* | (2006.01) | |
| *H04L 29/12* | (2006.01) | |
| *H04L 12/18* | (2006.01) | |
| *H04L 29/08* | (2006.01) | |

(52) U.S. Cl.
CPC ......... *H04L 12/4679* (2013.01); *H04L 12/185* (2013.01); *H04L 12/1886* (2013.01); *H04L 61/2069* (2013.01); *H04L 67/1065* (2013.01)

(58) Field of Classification Search
None
See application file for complete search history.

(56) References Cited

U.S. PATENT DOCUMENTS

| | | | | |
|---|---|---|---|---|
| 8,909,726 | B1* | 12/2014 | Eckert | H04L 61/00 709/207 |
| 2006/0221866 | A1* | 10/2006 | Shepherd | H04L 45/16 370/255 |
| 2008/0101360 | A1 | 5/2008 | Napierala | |
| 2008/0175240 | A1* | 7/2008 | Suzuki | H04L 12/18 370/390 |
| 2010/0111084 | A1* | 5/2010 | Yao | H04L 12/185 370/390 |
| 2011/0255536 | A1 | 10/2011 | Liu et al. | |
| 2012/0147885 | A1* | 6/2012 | Johri | H04L 45/16 370/390 |

FOREIGN PATENT DOCUMENTS

WO   PCTUS2015024250   6/2015

OTHER PUBLICATIONS

Y. Rekhter et al., "Extranet Multicast in BGP/IP MPLS VPNs," L3VPN Working Group, Internet Draft, Mar. 2014. pp. 1-55, Switzerland.

(Continued)

*Primary Examiner* — Duc Duong
(74) *Attorney, Agent, or Firm* — Ryan, Mason & Lewis, LLP (57) ABSTRACT

A first network device comprises a service routing element and a client routing element. The service routing element is configured with a first anycast rendezvous point address so as be an anycast rendezvous point peer with at least a second network device in a service routing domain. The client routing element is configured with a second anycast rendezvous point address so as to be an anycast rendezvous point peer with at least a third network device in a client routing domain. The first network device receives in its service routing element from a service routing element of the second network device a register message identifying a multicast source, and provides at least a portion of the register message from its service routing element to its client routing element in a manner that allows the third network device to learn the identity of the multicast source from the client routing element.

20 Claims, 4 Drawing Sheets

(56) References Cited

OTHER PUBLICATIONS

E.C. Rosen et al., "Multicast in MPLS/BGP IP VPNs," Network Working Group, Internet Draft, Oct. 2006, pp. 1-73.
R. Aggarwal et al., "Extranet in BGP Multicast VPN (MVPN)," Network Working Group, Internet Draft, Feb. 2010, 14 pages.
John Hardwick, "IP Multicast Explained," Data Connection Limited, Jun. 2004, 69 pages.
B. Fenner et al., "Protocol Independent Multicast—Sparse Mode (PIM-SM): Protocol Specification (Revised)," Network Working Group, Request for Comments: 4601, Aug. 2006, 112 pages.
D. Farinacci et al., "Anycast-RP Using Protocol Independent Multicast (PIM)," Network Working Group, Request for Comments: 4610, Aug. 2006, 12 pages.
E. Rosen et al., "BGP/MPLS IP Virtual Private Networks (VPNs)," Network Working Group, Request for Comments: 4364, Feb. 2006, 47 pages.
J. De Clercq et al., "BGP-MPLS IP Virtual Private Network (VPN) Extension for IPv6 VPN," Network Working Group, Request for Comments: 4659, Sep. 2006, 18 pages.
E. Rosen et al., "Multicast in MPLS/BGP IP VPNs," Internet Engineering Task Force (IETF), Request for Comments: 6513, Feb. 2012, 88 pages.
R. Aggarwal et al., "BGP Encodings and Procedures for Multicast in MPLS/BGP IP VPNs," Internet Engineering Task Force (IETF), Request for Comments: 6514, Feb. 2012, 59 pages.

\* cited by examiner

NETWORK DEVICE WITH SERVICE AND CLIENT ROUTING ELEMENTS CONFIGURED TO SUPPORT ANY-SOURCE MULTICAST EXTRANETS

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. However, these VPNs do not provide a way for IP multicast traffic to travel from one customer site to another.

The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

MVPNs in which all sender and receiver sites are associated with the same customer may be viewed as examples of what are commonly referred as "intranets." Some MVPNs encompass sites that are associated with different customers, and such MVPNs may be viewed as examples of what are commonly referred to as "extranets."

Accordingly, it is known to configure a given MVPN with extranet functionality so as to allow multicast sources associated with one customer to send multicast traffic to multicast receivers associated with other customers and similarly to allow multicast receivers associated with one customer to receive multicast traffic from multicast sources associated with other customers. Multicast sources in an MVPN extranet are referred to as "extranet sources." The multicast groups to which the extranet sources generate traffic are referred to as "extranet groups." The receivers that receive multicast traffic from extranet sources are referred to as "extranet receivers."

SUMMARY

Conventional MVPN extranets are problematic in that under certain circumstances one or more client VRFs will be unable to receive multicast traffic from a service VRF, where VRF refers to one or more tables associated with virtual routing and forwarding. For example, in MVPN extranets that utilize any-source multicast (ASM), a given client VRF and its associated customer edge (CE) elements will generally be unable to receive multicast traffic from a service VRF if an ASM rendezvous point (RP) is provisioned within the client VRF. Illustrative embodiments of the present invention advantageously address such situations in which client VRFs and their associated CE elements would otherwise be unable to support MVPN extranets when using ASM.

In one embodiment, a first network device comprises a service routing element and a client routing element. The first network device is illustratively configured as a receiver site of an MVPN extranet. The service routing element is configured with a first anycast RP address so as be an anycast RP peer with at least a second network device in a service routing domain. The client routing element is configured with a second anycast RP address so as to be an anycast RP peer with at least a third network device in a client routing domain. The first network device receives in its service routing element from a service routing element of the second network device a register message identifying a multicast source, and provides at least a portion of the register message from its service routing element to its client routing element in a manner that allows the third network device to learn the identity of the multicast source from the client routing element.

The service and client routing elements may comprise, for example, respective service and client VRFs.

In some embodiments, the client routing element replicates the register message to each of its anycast RP peers in the client routing domain such that each of its anycast RP peers learns the identity of the multicast source. For example, the client routing element may replicate the register message to at least one of its anycast RP peers for delivery over a (*,G) multicast tree that was previously created in response to a (*,G) join message not designating any particular multicast source, where G denotes a multicast group. The client routing element then receives from a given one of its anycast RP peers in the client routing domain an (S,G) join message that specifically designates the multicast source S.

The first, second and third network devices in some embodiments may comprise, for example, respective routers or other provider edge or customer edge elements associated with an IP-MPLS network, although it is to be appreciated that numerous other types of network devices and communication networks may be used in other embodiments.

DETAILED DESCRIPTION

Illustrative embodiments of the invention will be described herein with reference to exemplary communication networks, network devices, processes and associated communication protocols. It should be understood, however, that the invention is not limited to use with the particular arrangements described, but is instead more generally applicable to any communication network application in which it is desirable to ensure that all client routing elements can receive multicast traffic within a multicast extranet even when unspecified-source join messages are used.

Figure 1:
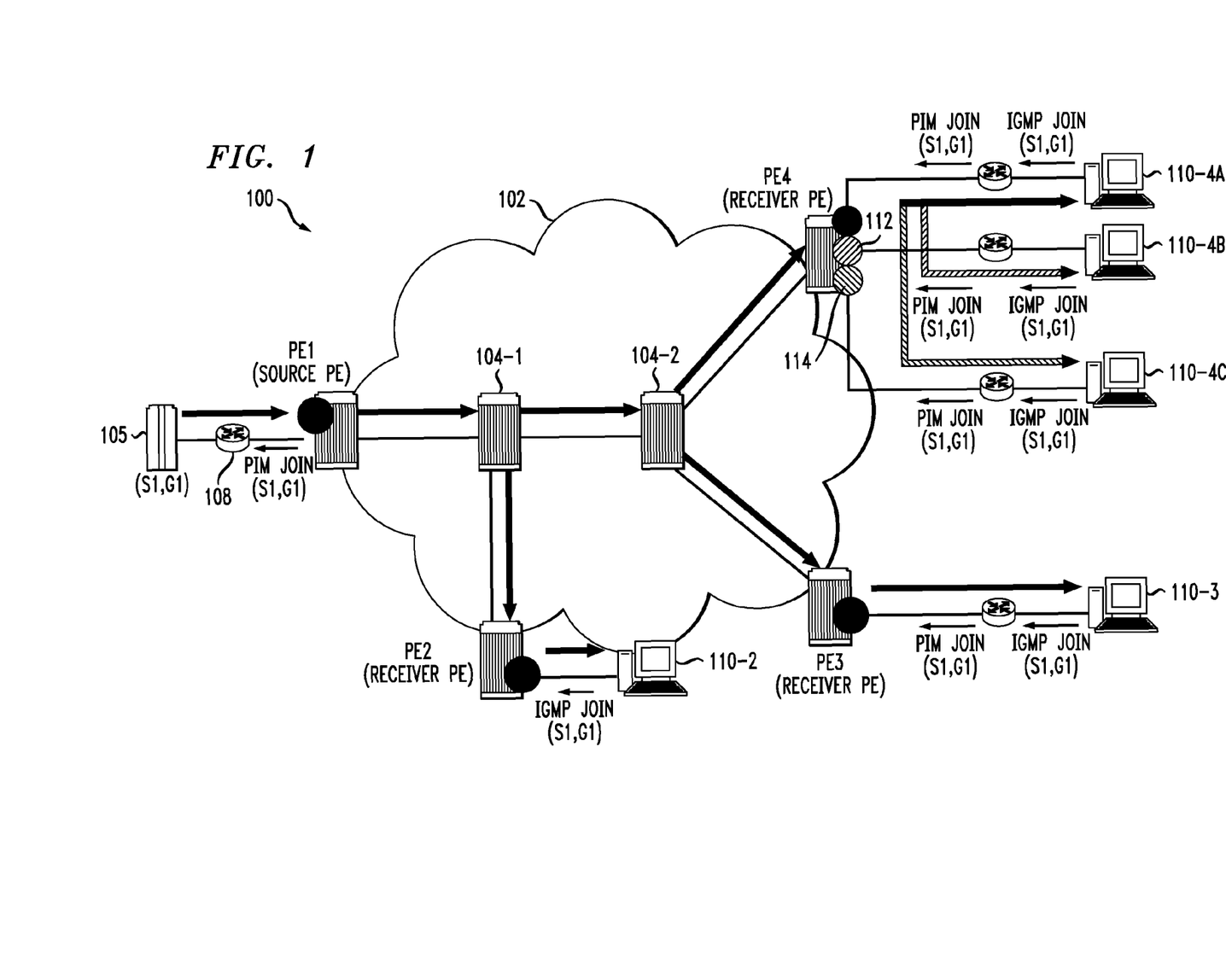
FIG. 1 shows a communication network that implements MVPN extranet functionality using ASM in a first illustrative embodiment of the invention.

FIG. 1 shows a communication network 100 that includes a service provider network 102 including core routers 104-1 and 104-2. The service provider network 102 includes a plurality of provider edge (PE) elements including a PE element PE1 coupled to a multicast source 105 and additional PE elements PE2, PE3 and PE4. Each of the PE elements PE1 through PE4 represents a site of at least one MVPN and can be characterized as being one of a sender-receiver site, a sender site, and a receiver site. More particularly, in this embodiment, PE element PE1 is assumed to be a sender site and PE elements PE2, PE3 and PE4 are assumed to be respective receiver sites of an MVPN.

The service provider network 102 may comprise, for example, an IP-MPLS network, although numerous other types of service provider networks can be used. For example, embodiments of the invention can be implemented using transport tunnels that are not MPLS tunnels.

These designations are examples of what are more generally referred to herein as "site types" of the PE elements. It is to be appreciated that this particular arrangement of site type designations is exemplary only, and further that the site type of a given PE element of the service provider network 102 can change over time. Moreover, other embodiments may utilize additional or alternative sets of site types.

The above-cited RFC 6513 illustratively defines a given MVPN as comprising two distinct sets of sites, namely, a Sender Sites set and a Receiver Sites set, with the following properties:

1. Sites in the Sender Sites set can originate multicast traffic to sites in the Receiver Sites set.

2. Sites not in the Receiver Sites set should not be able to receive multicast traffic originated by any site that is in the Sender Sites set.

3. Sites in the Receiver Sites set can receive multicast traffic originated by any site in the Sender Sites set.

4. Sites in the Receiver Sites set should not be able to receive multicast traffic originated by any site that is not in the Sender Sites set.

A sender-receiver site is both a sender site and a receiver site, and therefore a single PE element may be in both the Sender Sites set and the Receiver Sites set.

A PE element closest to the source of a given MVPN is referred to as a root PE element of that MVPN. In the present embodiment, the root PE element of the MVPN is the PE element PE1. Such a PE element may be connected directly to the source 105 or connected via one or more network devices of one or more networks. A given tunnel carrying multicast traffic for the MVPN would originate at the root PE element.

A PE element that comprises or is associated with a receiver site of the given MVPN is referred to as a leaf PE element of that MVPN. A given tunnel carrying multicast traffic for the MVPN would terminate at a leaf PE element. The PE elements PE2, PE3 and PE4 are examples of leaf PE elements in the present embodiment.

Multicast tunnels established for a given MVPN make efficient use of network links by avoiding traffic replication to individual receiver sites. These tunnels are unidirectional with respect to multicast traffic. In accordance with RFC 6513, each site is generally required to establish connectivity via tunnels to respective peer sites. By way of example, tunnels that would ordinarily be established between PE pairs in accordance with RFC 6513 include P-tunnels of a Provider Multicast Service Interface (PMSI), which may comprise an Inclusive PMSI (I-PMSI) or a Selective PMSI (S-PMSI). Such tunnels are used to build a multicast tree comprising the above-noted sender and receiver PE elements as respective root and leaf PEs of the multicast tree.

BGP attributes can be advertised or otherwise transmitted by the given PE element to all other PE elements in a corresponding I-PMSI or S-PMSI auto-discovery (A-D) route. Details regarding conventional aspects of BGP and A-D routes in the context of MVPNs are disclosed in RFC 6514, entitled "BGP Encodings and Procedures for Multicast in MPLS/BGP IP VPNs," which is incorporated by reference herein.

It should be understood, however, that MVPNs herein are not limited to those configured in accordance with RFC 6513 or RFC 6514, and a wide variety of other MVPN arrangements can be used in embodiments of the invention.

Each of the PE elements PE1 through PE4 maintains at least one Virtual Routing and Forwarding (VRF) table. A given such table contains information characterizing routes between the corresponding PE element and other PE elements that are associated with a given MVPN. The VRF tables in the FIG. 1 embodiment may be viewed as examples of what are more generally referred to herein as "routing tables." A VRF table or other routing table of a given PE element may be considered part of a routing information base (RIB) of that PE element. Exemplary VRF tables or their corresponding routing entities are also referred to herein as simply service VRFs or client VRFs. A given service or client VRF is not limited to one or more tables and may include additional or alternative routing logic or other components. Service or client VRFs are more generally referred to herein as respective "service routing elements" or "client routing elements."

The VRF tables of the respective receiver PE elements PE1 through PE4 are utilized in processing multicast join messages, which in the present embodiment include (S1,G1) join messages each configured to originate a route to a source S1 of a multicast group G1. These messages may be configured as Protocol Independent Multicast (PIM) messages or Internet Group Management Protocol (IGMP) messages, or combinations thereof as indicated in the figure, although other protocols could also be used.

The (S1,G1) join messages illustrated in FIG. 1 are examples of what are more generally referred to herein as source-specific joins or "source joins." It is assumed that other types of join messages are also utilized in this embodiment and other embodiments, including (*,G) join messages, where * denotes an unspecified multicast source, also referred to herein as unspecified-source joins or "shared joins." Shared joins and source joins in the present embodiment are generally associated with PIM Type 6 and Type 7 routes, respectively, although other types of routes can be used.

The sender PE element PE1 is also referred to as an upstream multicast hop (UMH) node relative to the receiver PE elements PE2, PE3 and PE4. The receiver PE elements process respective PIM or IGMP join messages as indicated in the figure in order to establish routes to the multicast source 105 via the sender PE element PE1.

The UMH sender PE element PE1 updates its VRF table based on the join messages and sends multicast traffic received from the multicast source 105 to the receiver PE elements PE2, PE3 and PE4 via the multicast tree. The associated routes for the multicast traffic are illustratively implemented as transport tunnels, such as point-to-multipoint (P2MP) tunnels or PIM generic route encapsulation (GRE) tunnels, although other types of tunnels can be used in other embodiments.

The PE elements and multicast sources may be considered examples of respective network nodes. Numerous other types and arrangements of nodes may be used in other embodiments. Thus, for example, other types of provider elements may be used that are not necessarily PE elements, such as a BGP route reflector (RR) element. A given BGP RR element can be coupled to the PE elements via an internal BGP (iBGP) mesh so as to serve as a peer for each of the PE elements, thereby avoiding the need for each of the PE elements to peer with each of the other PE elements in a full mesh arrangement. In this peering context, the BGP RR element is also referred to as a route reflector server and the PE elements are referred to as respective route reflector clients.

The term "node" as used herein is intended to be broadly construed, and accordingly may comprise, for example, an entire network device or one or more components of a network device.

The network nodes in embodiments of the invention may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE elements PE1 through PE4 of the service provider network 102 are therefore considered examples of what are more generally referred to herein as "network devices." Other examples of network devices are also shown in the FIG. 1 embodiment.

Each of the PE elements in the FIG. 1 embodiment more particularly implements an instance of what is referred to herein as a service VRF. These service VRFs are illustrated as circles having common shading in respective ones of the PE elements PE1 through PE4. A particular one of the PE elements, in this case PE element PE4, also implements multiple instances of what are referred to herein as client VRFs.

The service VRFs of the PE elements PE1 through PE4 collectively form an example of what is more generally referred to herein as a "service routing domain."

The service VRF of PE1 communicates with the multicast source 105 via a router 108. Similarly, the service VRFs of PE3 and PE4 communicate with computers 110-3 and 110-4A via respective routers. Also, client VRFs 112 and 114 of PE4 communicate with respective computers 110-4B and 110-4C via respective routers. These routers may be viewed as examples of what are more generally referred to herein as customer edge (CE) elements. Although the CE elements are illustratively shown as being outside of the service provider network 102, in other embodiments at least a subset of the CE elements can instead be part of the service provider network 102. The service VRF of PE2 directly communicates with a computer 110-2 as illustrated. The computers 110 may be viewed as illustrative examples of receivers attached to CE elements.

The client VRFs 112 and 114 and their corresponding routers and computers collectively form one or more examples of what are more generally referred to herein as a "client routing domain."

The multicast join messages illustrated in the figure are examples of what are referred to herein as source-specific joins. More particularly, as mentioned above, each (S1,G1) join message is configured to originate a route to a particular source S1 of a multicast group G1. The source S1 is assumed to denote multicast source 105. The computers 110-3 and 110-4A, B and C each generate an IGMP (S1,G1) join message. These messages are converted by the corresponding routers to PIM (S1,G1) join messages that are delivered to the appropriate service VRF or client VRF of the PE element PE3 or PE4 as illustrated in the figure. Computer 110-2 also generates an IGMP (S1,G1) join message but it is supplied directly to the service VRF of PE element PE2.

In this exemplary source-specific multicasting arrangement, multicast traffic carried from PE1 to PE4 using the service VRFs is also received in the client VRFs 112 and 114. Such an arrangement can be configured using the following steps:

1. A BGP policy is configured on PE4 to import the unicast route for source S1 into the client VRFs 112 and 114. This is done using a route target policy.

2. When PE1 originates the unicast route for S1, it will send a route distinguisher (RD) denoted RD1 and the corresponding route target.

3. The service VRF of PE1 also originates an I-PMSI route. This route contains the route descriptor RD1 associated with the service VRF of PE1, a system address of PE1 and a multicast tunnel group address associated with the service VRF.

4. When PE4 receives the I-PMSI route, it installs the route in an extranet database.

5. When an (S1,G1) join message is received in the client VRF 112 or 114, a PIM instance associated with the client VRF is used to perform a lookup of the unicast route for S1. The unicast route for S1 identifies the next hop as PE1 and contains the route descriptor RD1 originated by the service VRF of PE1.

6. The PIM instance will then perform a lookup in the extranet database to see if there is any VRF that has received an I-PMSI route from PE1 with the same route descriptor RD1.

7. If it finds the I-PMSI route in the extranet database, it will know the VRF which installed the route.

8. If the VRF that installed the I-PMSI route is different from its VRF, the PIM instance associated with the client VRF will then send the join to the service VRF. The service VRF attracts the multicast traffic from PE1 over the service tunnel and forwards it into the appropriate client VRF 112 or 114.

Although the foregoing process is appropriate for use in a source-specific multicasting arrangement, problems can arise when attempting to use this or a similar process to configure an unspecified-source multicasting arrangement using the above-described (*,G) join messages. For example, in MVPN extranets that utilize any-source multicast (ASM), client VRFs of a receiver PE element will be unable to receive multicast traffic from the service VRF of a sender PE element if the ASM rendezvous point (RP) is provisioned within one of the client VRFs. This is because the (*,G) join is sent to the RP provisioned within the client VRF and that RP discovers the source using a PIM register mechanism. Each customer would have its own RPs and the (*,G) join originated within a given client VRF of a particular customer would be sent to the corresponding RP. Accordingly, the identity of source S1 in the service VRF of PE4 would not be known to the client VRFs 112 and 114 because the register message sent by the service VRF of PE1 will only be sent to the RPs in the service VRF domain. The RPs in the client VRF domains will not learn about the source S1 and therefore cannot receive multicast traffic from that source.

These and other issues associated with MVPN extranets are illustratively addressed in the FIG. 1 embodiment in a manner described below. As will become apparent, in some embodiments this involves use of PIM Anycast-RP techniques disclosed in RFC 4610, entitled "Anycast-RP Using Protocol-Independent Multicast (PIM)," August 2006, which is incorporated by reference herein. Anycast-RP allows multiple routers or other network devices to be configured with the same RP address, also referred to as the "anycast RP address." A router connected directly to the multicast source is referred to as the source designated router (DR) and sends unicast register messages to the anycast RP address. The RP that is closest to the source DR receives the register messages. Once that RP receives a given register message, it replicates the register message to its anycast RP peers. As a result, all of the anycast RP peers associated with the common anycast RP address will learn the identity of the multicast source. See also RFC 4601, entitled "Protocol Independent Multicast-Sparse Mode (PIM-SM): Protocol Specification (Revised)," August 2006, which is also incorporated by reference herein.

An exemplary process for configuring an MVPN extranet using ASM in the FIG. 1 embodiment includes the following steps:

1. Configure the service VRF of PE4 with the anycast RP address such that it is an anycast RP peer of the service VRF of PE1. This will ensure that register messages are received in the service VRF of PE4.

2. Configure the client VRFs 112 and 114 as anycast peers within their respective client VRF domains.

3. Configure an internal inter-process communication mechanism or other type of internal communication channel within PE4 to deliver the register messages received by the service VRF of PE4 to the client VRFs 112 and 114. For a given client VRF domain associated with client VRF 112 or client VRF 114, this will generally involve the service VRF of PE4 changing the destination address of the register message to the anycast RP address configured in that client VRF domain.

4. The client VRFs will process the register messages from the service VRF as if they are received from the designated router. As per RFC 4610, the client VRFs will replicate this register message to the anycast RP peers in their respective client VRF domains. This will ensure that all of the routers or other network devices in each client VRF domain will learn the identity of the multicast source.

5. One or more of the anycast RP peers in each client VRF domain will send an (S,G) join designating the multicast source. This will ensure that multicast traffic will be received by the client VRFs from the service VRF.

Additional illustrative embodiments that incorporate support for MVPN extranets using ASM will be described below with reference to FIGS. 2 through 4.

Figure 2:
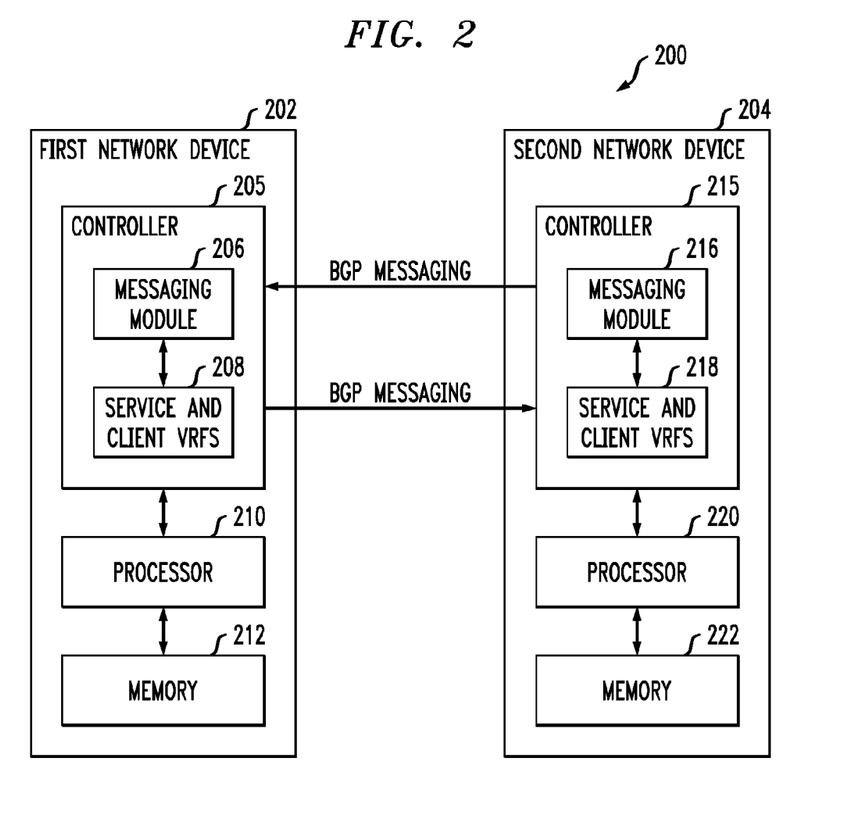
FIG. 2 shows first and second network devices in a second illustrative embodiment of the invention.

Referring now to FIG. 2, a communication network 200 includes at least first and second network devices 202 and 204. The first and second network devices 202 and 204 are assumed to be configurable as sender or receiver PE elements of an MVPN extranet.

In the FIG. 2 embodiment, the first network device 202 is adapted for communication with the second network device 204, and vice versa. Each of these network devices is also assumed to be adapted for communication with one or more other network devices not explicitly shown in the figure.

The first network device 202 comprises a controller 205 that includes a messaging module 206 coupled to service and client VRFs 208. The first network device 202 further comprises a processor 210 coupled to the controller 205 and to a memory 212. The second network device 204 comprises a controller 215 that includes a messaging module 216 coupled to service and client VRFs 218. The second network device 204 further comprises a processor 220 coupled to the controller 215 and to a memory 222.

Also in the FIG. 2 embodiment, BGP messages are exchanged between the controllers 205 and 215 utilizing the messaging modules 206 and 216. These elements are assumed to implement MVPN functionality similar to that described in the above-cited RFC 6513 and 6514, but suitably modified to support functionality for MVPN extranets using ASM as disclosed herein.

The first network device 202 is assumed to comprise a service VRF in component 208 that is configured with a first anycast RP address so as be an anycast RP peer with the second network device 204. The second network device 204 also comprises a service VRF in component 218 that is part of the same service routing domain as the service VRF in component 208 of first network device 202.

At least one of the first and second network devices further comprises a client VRF in component 208 or 218 that is configured with a second anycast RP address so as to be an anycast RP peer with at least a third network device that is part of the same client routing domain as the client VRF.

In such an arrangement, the first or second network device 202 or 204 is configured to receive in its service VRF from the service VRF of the other network device a register message identifying a multicast source, and to provide at least a portion of the register message from its service VRF to its client VRF in a manner that allows the third network device to learn the identity of the multicast source from the client VRF.

Each of the network devices 202 and 204 comprises processor 210 or 220 and memory 212 or 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of controller 205 in network device 202, one or more of the modules 216 and 218 of controller 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. Articles of manufacture comprising such computer program products or other computer-readable storage media are considered embodiments of the invention.

The memory 212 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The processor, memory, controller and other components of a given network device of communication network 200 may include well-known circuitry suitably modified to implement at least a portion of the MVPN extranet functionality described above. Conventional aspects of such circuitry are well known to those skilled in the art and therefore will not be described in detail herein.

It is to be appreciated that the particular arrangement of network device components shown in FIG. 2 is exemplary only, and numerous alternative network device configurations may be used in other embodiments. For example, the network devices can be configured to incorporate additional or alternative components and to incorporate support for numerous other types of messaging in accordance with other communication protocols. Also, the particular types of multicast extranets and associated service and client routing elements can be varied in other embodiments.

Figure 3:
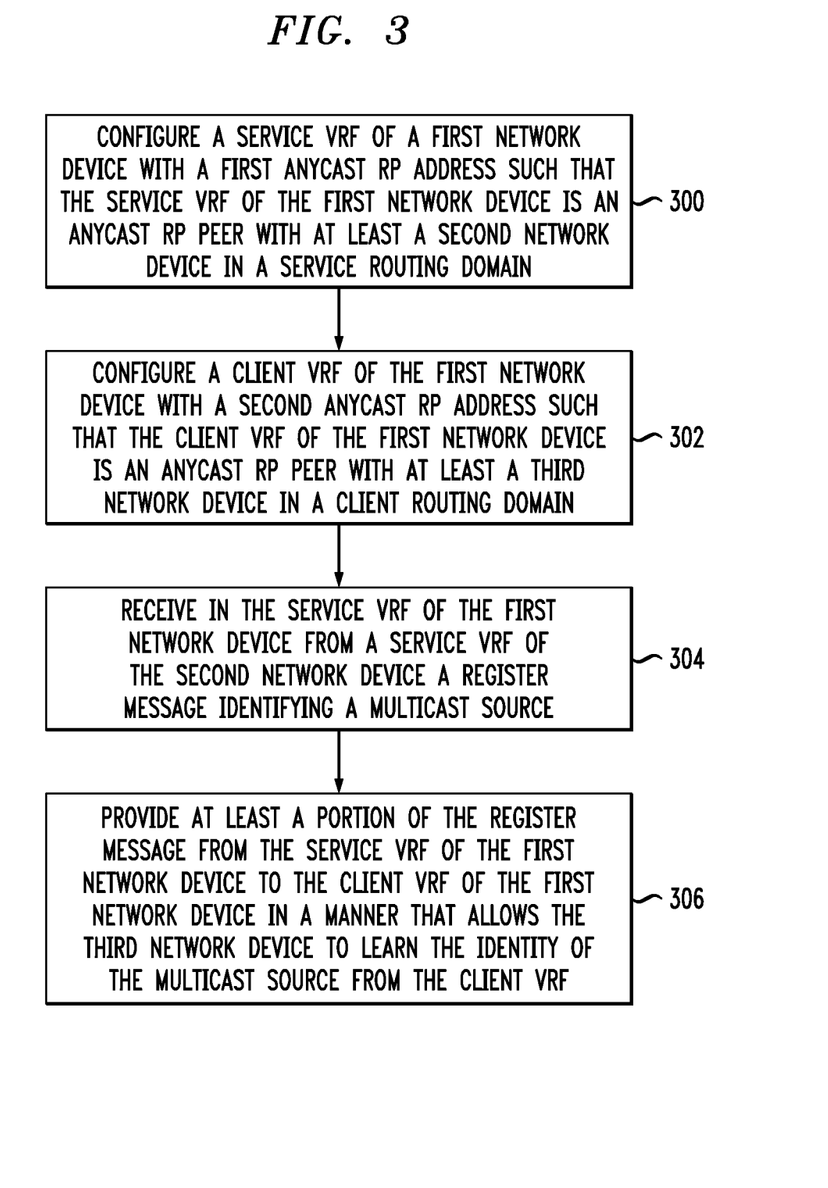
FIG. 3 is a flow diagram of an exemplary MVPN extranet control process carried out in a third illustrative embodiment.

An exemplary MVPN extranet control process in an illustrative embodiment is illustrated in the flow diagram of FIG. 3, which includes steps 300 through 306 that are assumed to be performed by a first network device that includes both service and client VRFs. Such a network device may correspond, for example, to the receiver PE element PE4 of FIG. 1 or one of the first and second network devices 202 and 204 of FIG. 2.

In step 300, the service VRF of the first network device is configured with a first anycast RP address such that the service VRF of the first network device is an anycast RP peer with at least a second network device in a service routing domain.

In step 302, the client VRF of the first network device is configured with a second anycast RP address such that the client VRF of the first network device is an anycast RP peer with at least a third network device in a client routing domain.

In step 304, the service VRF of the first network device receives from a service VRF of the second network device a register message identifying a multicast source. By way of example, the register message illustratively comprises a PIM register message, with the PIM register message being generated in response to the multicast source sending traffic for a multicast group.

In step 306, at least a portion of the register message is provided from the service VRF of the first network device to the client VRF of the first network device in a manner that allows the third network device to learn the identity of the multicast source from the client VRF.

The first network device can provide at least a portion of the register message from its service VRF to its client VRF by changing a destination address of the register message in the service VRF from the first anycast RP address to the second anycast RP address and forwarding the register message from the service VRF to the client VRF with the changed destination address.

Other techniques can be used to convey the register message or a portion thereof from the service VRF to the client VRF within the first network device. For example, in the embodiments of FIGS. 1 and 4, internal communication channels between the service and client VRFs of the network device are configured for this purpose.

In the present embodiment, it is assumed that the client VRF of the first network device replicates the register message to each of its anycast RP peers in the client routing domain such that each of its anycast RP peers learns the identity of the multicast source. For example, the client routing element may replicate the register message to at least one of its anycast RP peers for delivery over a (*,G) multicast tree that was previously created in response to a (*,G) join message not designating any particular multicast source, where G denotes a multicast group. The client routing element then receives from a given one of its anycast RP peers in the client routing domain responsive to the replicated register message an (S,G) join message that specifically designates the multicast source S.

The particular process steps and other operations described above in conjunction with the flow diagram of FIG. 3 are exemplary only, and additional or alternative process steps or operations may be used in other embodiments.

For example, in other embodiments, the client VRF of the first network device is itself an RP, such that the third network device can be eliminated from the exemplary process as described in FIG. 3. The FIG. 3 process steps can be adjusted in a straightforward manner to accommodate these and other alternative arrangements.

Figure 4:
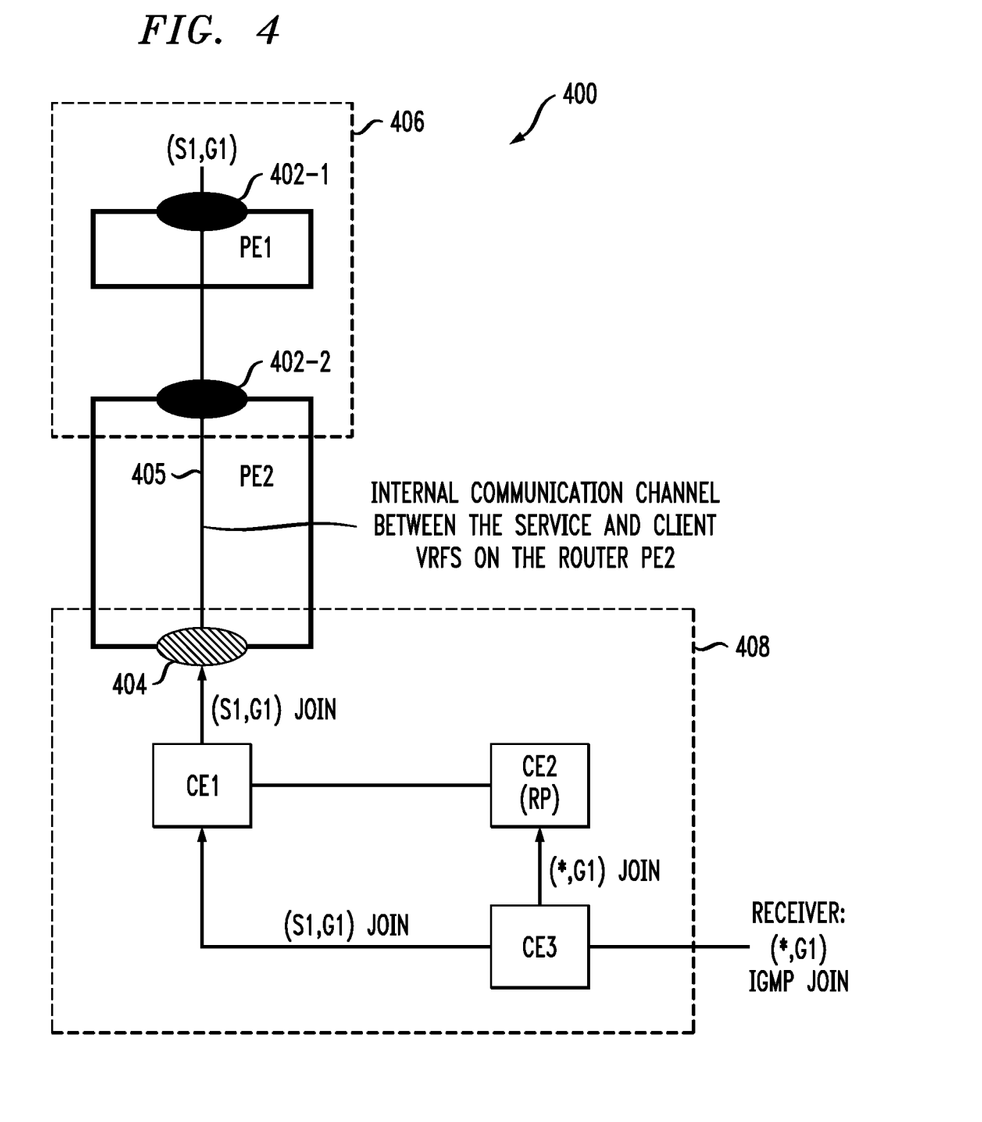
FIG. 4 illustrates communication between provider edge and customer edge elements in a fourth illustrative embodiment of the invention.

Referring now to FIG. 4, the network 400 comprises PE elements PE1 and PE2 and CE elements CE1, CE2 and CE3 arranged as shown in the figure. The CE elements illustratively comprise respective routers. The PE elements PE1 and PE2 comprise respective service VRFs 402-1 and 402-2. The PE element PE2 further comprises a client VRF 404 and an internal communication channel 405 arranged between the service VRF 402-2 and the client VRF 404. The service VRFs 402-1 and 402-2 are part of a service VRF domain 406. The CE elements CE1, CE2 and CE3 and the client VRF 404 are illustratively denoted as comprising a client VRF domain 408. It should be noted that the exemplary PE elements PE1 and PE2 in this embodiment are not intended to correspond directly to the respective PE elements PE1 and PE2 in the FIG. 1 embodiment.

The MVPN extranet control process in the illustrative embodiment of FIG. 4 includes the following steps:

1. Configure the service VRFs 402-1 and 402-2 of respective PE elements PE1 and PE2 with a first anycast RP address such that the service VRFs 402-1 and 402-2 are anycast RP peers in the service VRF domain 406. The first anycast RP address is illustratively the address of the PE element PE1, which corresponds to the RP within the service VRF domain 406 comprising service VRFs 402-1 and 402-2.

2. Configure the client VRF 404 of the PE element PE2 and the CE element CE1 with a second anycast RP address such that the client VRF 404 and CE1 are anycast peers within the client VRF domain 408. The second anycast RP address is illustratively the address of the CE element CE2, which corresponds to the RP within the client VRF domain 408.

3. Configure internal communication channel 405 within PE2 to deliver the register messages received by the anycast RP in the service VRF domain 406 to the anycast RP in the client VRF domain 408. This may involve, for example, the service VRF 402-2 changing the destination address of the register message to the anycast RP address configured in the client VRF domain 408.

4. A computer or other receiver coupled to CE3 generates an IGMP (*,G1) join as illustrated. The multicast traffic for group G1 is to be sent from multicast source S1 via the service VRFs 402-1 and 402-2.

5. CE3 originates a PIM (*,G1) join in accordance with RFC 4601 towards the nearest RP which in this case is CE2. At this point, the client VRF domain 408 does not know the identity of the multicast source S1.

6. When the multicast source S1 starts sending multicast traffic, the anycast RP corresponding to PE1 will send a register message to its anycast peer PE2 in accordance with RFC 4610.

7. When the service VRF 402-2 of PE2 receives the register message from the service VRF 402-1 of PE1, it sends the register message to the client VRF 404 via the internal communication channel 405.

8. The client VRF 404 treats the register message received from service VRF 402-2 as having been received from the designated router. In accordance with RFC 4610, the client VRF 404 will send the received register message to its anycast RP peer CE2. CE2 will send this register message to CE3 via the (*,G1) multicast tree such that CE3 will learn the identity of the multicast source S1 and can receive the multicast traffic from S1.

9. CE3 will send an (S1,G1) join to CE1 designating the multicast source S1. Assuming this path is part of a shortest path tree, CE3 switches over to this tree and prunes the (*,G) multicast tree by sending an (S1,G1,rpt) prune message to CE2. If CE2 no longer wishes to receive the multicast traffic from S1, it will send a register-stop message in response to the register message it receives from its anycast peers. The anycast peer on PE2 ignores this register-stop message as per RFC 4601 and RFC 4610.

The above-described exemplary network devices and associated processes described in conjunction with the illustrative embodiments of FIGS. 1 through 4 advantageously ensure that multicast extranets can operate properly using ASM. Other embodiments can utilize additional or alternative components or process steps, as well as different multicast extranet arrangements and associated messaging.

As mentioned above, embodiments of the present invention may be implemented in the form of articles of manufacture each comprising one or more software programs that are executed by processing circuitry of a network device or other processing device of a communication network.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of particular communication protocols such as IP, BGP and MPLS, other types of networks can be used in other embodiments. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication protocols and process steps for implementing multicast extranet functionality. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a first network device adapted for communication with a plurality of other network devices;
the first network device comprising:
a service routing element configured with a first anycast rendezvous point address so as be an anycast rendezvous point peer with at least a second network device in a service routing domain; and
a client routing element configured with a second anycast rendezvous point address so as to be an anycast rendezvous point peer with at least a third network device in a client routing domain;
wherein the first network device is configured to receive in its service routing element from a service routing element of the second network device a register message identifying a multicast source, and to provide at least a portion of the register message from its service routing element to its client routing element in a manner that allows the third network device to learn the identity of the multicast source from the client routing element;
wherein the first network device comprises a provider edge device spanning the service and client routing domains; and
wherein the third network device comprises a customer edge device in the client routing domain.

2. The apparatus of claim 1 wherein the service and client routing elements comprise respective service and client virtual routing and forwarding (VRF) elements.

3. The apparatus of claim 1 wherein the first network device comprises a provider edge (PE) element configured as a receiver PE element of a Multicast Virtual Private Network (MVPN) extranet.

4. The apparatus of claim 3 wherein the MVPN extranet is configured to support any-source multicast (ASM).

5. The apparatus of claim 3 wherein the second network device comprises a PE element configured as a source PE element of the MVPN extranet.

6. The apparatus of claim 5 wherein the third network device comprises a customer edge (CE) element of the MVPN extranet.

7. The apparatus of claim 1 wherein the register message comprises a protocol-independent multicast (PIM) register message.

8. The apparatus of claim 7 wherein the PIM register message is generated in response to the multicast source sending traffic for a multicast group.

9. The apparatus of claim 1 wherein the first network device is further configured to provide at least a portion of the register message from the service routing element of the first network device to the client routing element of the first network device by changing a destination address of the register message in the service routing element from the first anycast rendezvous point address to the second anycast rendezvous point address and forwarding the register message from the service routing element to the client routing element with the changed destination address.

10. The apparatus of claim 1 wherein the client routing element replicates the register message to each of its anycast rendezvous point peers in the client routing domain such that each of its anycast rendezvous point peers learns the identity of the multicast source.

11. A communication network comprising the apparatus of claim 1.

12. An apparatus comprising:
a first network device adapted for communication with a plurality of other network devices;
the first network device comprising:
a service routing element configured with a first anycast rendezvous point address so as be an anycast rendezvous point peer with at least a second network device in a service routing domain; and
a client routing element configured with a second anycast rendezvous point address so as to be an anycast rendezvous point peer with at least a third network device in a client routing domain;
wherein the first network device is configured to receive in its service routing element from a service routing element of the second network device a register message identifying a multicast source, and to provide at least a portion of the register message from its service routing element to its client routing element in a manner that allows the third network device to learn the identity of the multicast source from the client routing element; and
wherein the client routing element replicates the register message to at least one of its anycast rendezvous point peers for delivery over a (*,G) multicast tree that was previously created in response to a (*,G) join message not designating any particular multicast source, where G denotes a multicast group.

13. The apparatus of claim 12 wherein the client routing element receives from a given one of its anycast rendezvous point peers in the client routing domain responsive to the replicated register message an (S,G) join message specifically designating the multicast source, where S denotes the multicast source and G denotes a multicast group.

14. A method comprising:
configuring a service routing element of a first network device with a first anycast rendezvous point address such that the service routing element of the first network device is an anycast rendezvous point peer with at least a second network device in a service routing domain;
configuring a client routing element of the first network device with a second anycast rendezvous point address such that the client routing element of the first network device is an anycast rendezvous point peer with at least a third network device in a client routing domain;
receiving in the service routing element of the first network device from a service routing element of the second network device a register message identifying a multicast source; and
providing at least a portion of the register message from the service routing element of the first network device to the client routing element of the first network device in a manner that allows the third network device to learn the identity of the multicast source from the client routing element;
wherein the first network device comprises a provider edge device spanning the service and client routing domains; and
wherein the third network device comprises a customer edge device in the client routing domain.

15. The method of claim 14 wherein the service and client routing elements comprise respective service and client virtual routing and forwarding (VRF) elements.

16. The method of claim 14 wherein providing at least a portion of the register message from the service routing element of the first network device to the client routing element of the first network device comprises:
changing a destination address of the register message in the service routing element from the first anycast rendezvous point address to the second anycast rendezvous point address; and
forwarding the register message from the service routing element to the client routing element with the changed destination address.

17. The method of claim 14 further comprising the client routing element replicating the register message to each of its anycast rendezvous point peers in the client routing domain such that each of its anycast rendezvous point peers learns the identity of the multicast source.

18. A method comprising:
configuring a service routing element of a first network device with a first anycast rendezvous point address such that the service routing element of the first network device is an anycast rendezvous point peer with at least a second network device in a service routing domain;
configuring a client routing element of the first network device with a second anycast rendezvous point address such that the client routing element of the first network device is an anycast rendezvous point peer with at least a third network device in a client routing domain;
receiving in the service routing element of the first network device from a service routing element of the second network device a register message identifying a multicast source; and
providing at least a portion of the register message from the service routing element of the first network device to the client routing element of the first network device in a manner that allows the third network device to learn the identity of the multicast source from the client routing element;
wherein the client routing element replicates the register message to at least one of its anycast rendezvous point peers for delivery over a (*,G) multicast tree that was previously created in response to a (*,G) join message not designating any particular multicast source, where G denotes a multicast group.

19. The method of claim 18 further comprising the client routing element receiving from a given one of its anycast rendezvous point peers in the client routing domain an (S,G) join message specifically designating the multicast source, where S denotes the multicast source and G denotes a multicast group.

20. A non-transitory processor-readable storage medium having embodied therein executable program code that when executed by a processor of the first network device causes the first network device:
to configure a service routing element of the first network device with a first anycast rendezvous point address such that the service routing element of the first network device is an anycast rendezvous point peer with at least a second network device in a service routing domain;

to configure a client routing element of the first network device with a second anycast rendezvous point address such that the client routing element of the first network device is an anycast rendezvous point peer with at least a third network device in a client routing domain;

to receive in the service routing element of the first network device from a service routing element of the second network device a register message identifying a multicast source; and to provide at least a portion of the register message from the service routing element of the first network device to the client routing element of the first network device in a manner that allows the third network device to learn the identity of the multicast source from the client routing element;

wherein the first network device comprises a provider edge device spanning the service and client routing domains; and wherein the third network device comprises a customer edge device in the client routing domain.

* * * * *